(12) United States Patent
Van Winkle

(10) Patent No.: US 7,523,644 B2
(45) Date of Patent: Apr. 28, 2009

(54) METHOD AND APPARATUS FOR VERIFYING THE INTEGRITY OF A JOINT SEAL

(75) Inventor: Denzal Wayne Van Winkle, Santa Maria, CA (US)

(73) Assignee: Varco I/P, Houston, TX (US)

( * ) Notice: Subject to any disclaimer, the term of this patent is extended or adjusted under 35 U.S.C. 154(b) by 515 days.

(21) Appl. No.: 11/162,383

(22) Filed: Sep. 8, 2005

(65) Prior Publication Data
US 2007/0051164 A1    Mar. 8, 2007

(51) Int. Cl.
*G01M 3/02* (2006.01)
(52) U.S. Cl. .................... 73/37; 73/40; 73/46; 73/49.3; 73/49.8; 73/52
(58) Field of Classification Search ............ 73/37, 73/37.5, 37.6, 37.9, 40, 40.7, 46, 49.1, 49.3, 73/49.8, 52
See application file for complete search history.

(56) References Cited

U.S. PATENT DOCUMENTS

| | | | | |
|---|---|---|---|---|
| 3,872,713 A | * | 3/1975 | Ilfrey et al. ............... | 73/40.5 R |
| 3,895,831 A | * | 7/1975 | Fisher ........................ | 285/93 |
| 4,090,395 A | * | 5/1978 | Dixon et al. ............. | 73/40.5 R |
| 4,111,405 A | | 9/1978 | Krelis et al. | |
| 4,323,256 A | | 4/1982 | Miyagishima et al. | |
| 4,706,494 A | * | 11/1987 | Creed et al. ................... | 73/49.3 |
| 4,722,392 A | | 2/1988 | Proctor et al. | |
| 4,840,229 A | | 6/1989 | Proctor et al. | |
| 5,285,678 A | * | 2/1994 | McDaniel et al. ............ | 73/49.3 |
| 5,852,093 A | | 12/1998 | Aimura et al. | |
| 6,247,537 B1 | | 6/2001 | Dallas | |
| 6,409,176 B2 | | 6/2002 | Allen | |
| 6,711,938 B2 | * | 3/2004 | Huff .............................. | 73/37 |
| 7,040,394 B2 | | 5/2006 | Bailey et al. | |

* cited by examiner

*Primary Examiner*—Hezron Williams
*Assistant Examiner*—Samir M Shah
(74) *Attorney, Agent, or Firm*—Law Office of Tim Cook P.C.

(57) ABSTRACT

A system for verifying the integrity of a seal comprises an elastomeric seal on either side of a metal sealing gasket. A pressure test penetration is provided into an axial channel at a position between the metal sealing gasket and the lower of the elastomeric seals.

5 Claims, 3 Drawing Sheets

METHOD AND APPARATUS FOR VERIFYING THE INTEGRITY OF A JOINT SEAL

FIELD OF THE INVENTION

The present invention relates generally to the field of seal testing in pipe and, more particularly to a method and a system for testing a metal-to-metal seal without having to fill the pipe.

BACKGROUND OF THE INVENTION

In many applications, one section of pipe is joined to another section of pipe, and thereafter the pipe is subjected to high pressure fluid within the pipe. Often, the joint must be taken apart for various evolutions and then made up again to carry the high pressure fluid. In each instance, it is desirable to verify that the joint is properly sealed and will carry the pressure without leakage.

For example, the oil well service industry offers a number of opportunities wherein joints of pipe are made up and broken down, thereafter requiring verification that the pipe joints will hold an operating pressure. In particular, tools for cleaning, measuring, stimulating, logging, or perforating are installed in a section of tube, referred to as a "lubricator" in the industry. The lubricator is positioned above a closed valve or blowout preventer. The entire lubricator assembly is then filled with a suitable fluid and pressure tested to the anticipated maximum pressure to be encountered in operation. In practice, the tools are introduced into the well many times, requiring filling the lubricator to repeat the testing procedure.

These operations require the use of a test fluid that is compatible with operations to follow the pressure test. Otherwise, the operations will be contaminated with incompatible fluid. Also, since the entire lubricator must be filled with the test fluid, unnecessarily large quantities of test fluid are required.

Thus, there remains a need for a system and method whereby the newly remade joint may be pressure tested using any convenient fluid and using a minimum of this fluid. The present invention is directed to filling this need in the art.

SUMMARY OF THE INVENTION

The present invention addresses these and other drawbacks in the prior art by providing an elastomeric seal on either side of a metal sealing gasket. A pressure test penetration is provided into a seal sleeve at a position between the metal sealing gasket and the lower of the elastomeric seals.

In order to confirm the integrity of the metal sealing gasket, and thus the pipe joint, an appropriate fluid is brought up to pressure in the pressure test penetration. This requires a minimum quantity of the fluid, and any appropriate fluid such as a hydraulic lubricant fluid, may be used. The pressure is maintained for a period of time in order to determine if pressure drops, indicating a leak in the metal-to-metal seal between flanges of the pipe joint.

These and other features and advantages of this invention will be readily apparent to those skilled in the art.

BRIEF DESCRIPTION OF THE DRAWINGS

So that the manner in which the above recited features, advantages and objects of the present invention are attained and can be understood in detail, more particular description of the invention, briefly summarized above, may be had by reference to embodiments thereof which are illustrated in the appended drawings.

DETAILED DESCRIPTION OF A PREFERRED EMBODIMENT

Figure 1:
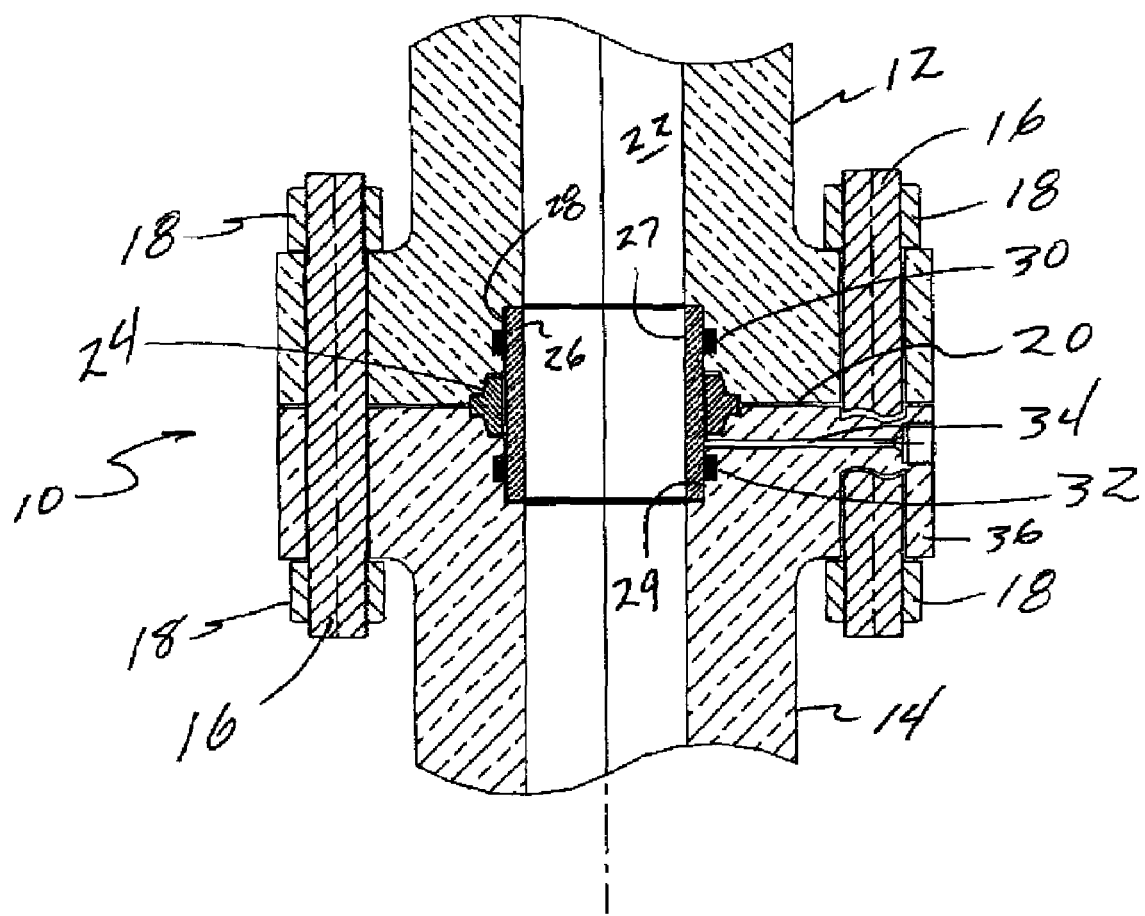
FIG. 1 is an elevation section view of a pipe joint with the test device of the present invention.

FIG. 1 depicts a pipe joint 10 with a test seal device of the present invention installed. The pipe joint 10 includes an upper flanged hub 12 and a lower flanged hub 14 held together with a plurality of studs 16 and numbers 18. A seam 20 between the upper and lower flanged hubs presents a path for leakage of high pressure fluid from an axial channel 22.

The seam 20 is sealed with a metal sealing gasket 24, also referred to herein as a metal seal, but once the channel 22 is under pressure, the gasket 24 may leak. It is therefore desirable to test the integrity of this gasket prior to applying pressure to the channel. The present invention provides a means of testing this integrity.

The testing device of the present invention includes a seal sleeve 26 having an inside surface 27 flush with the inside surface of the channel 22 and an outside surface 28 extending into the hubs 12 and 14. Thus, the seal sleeve 26 fits within a recess 29 formed into the inside surface of the upper seal body and lower seal body, which together define the channel 22. The recess 29 is therefore formed of upper and lower recesses in the upper flanged hub 12 and the lower flanged hub 14, respectively. In a preferred embodiment, the metal sealing gasket 24 spans the upper and lower recesses, as shown in FIG. 1. An upper elastomeric seal 30 and a lower elastomeric seal 32 provide a seal between the upper and lower hubs, respectively, and the seal sleeve 26.

A test port 34 penetrates through a flange member 36 of the lower flanged hub 14 into region of the seal sleeve. The total volume of the test port 34 is very small, relative to the volume that would be required to pressure test the pipe joint from within. The test port penetrates through the flange member at a point between the metal sealing gasket 24 and the lower elastomeric seal 32. In operation, the test port 34 is pressurized with a convenient fluid, such as for example a hydraulic lubricating fluid, and held at pressure for a predetermined period. If the pressure in the test port is maintained for this predetermined period, the metal sealing gasket is intact and the joint does not leak. The joint is then ready for pressurization at operating pressure.

Figure 2:
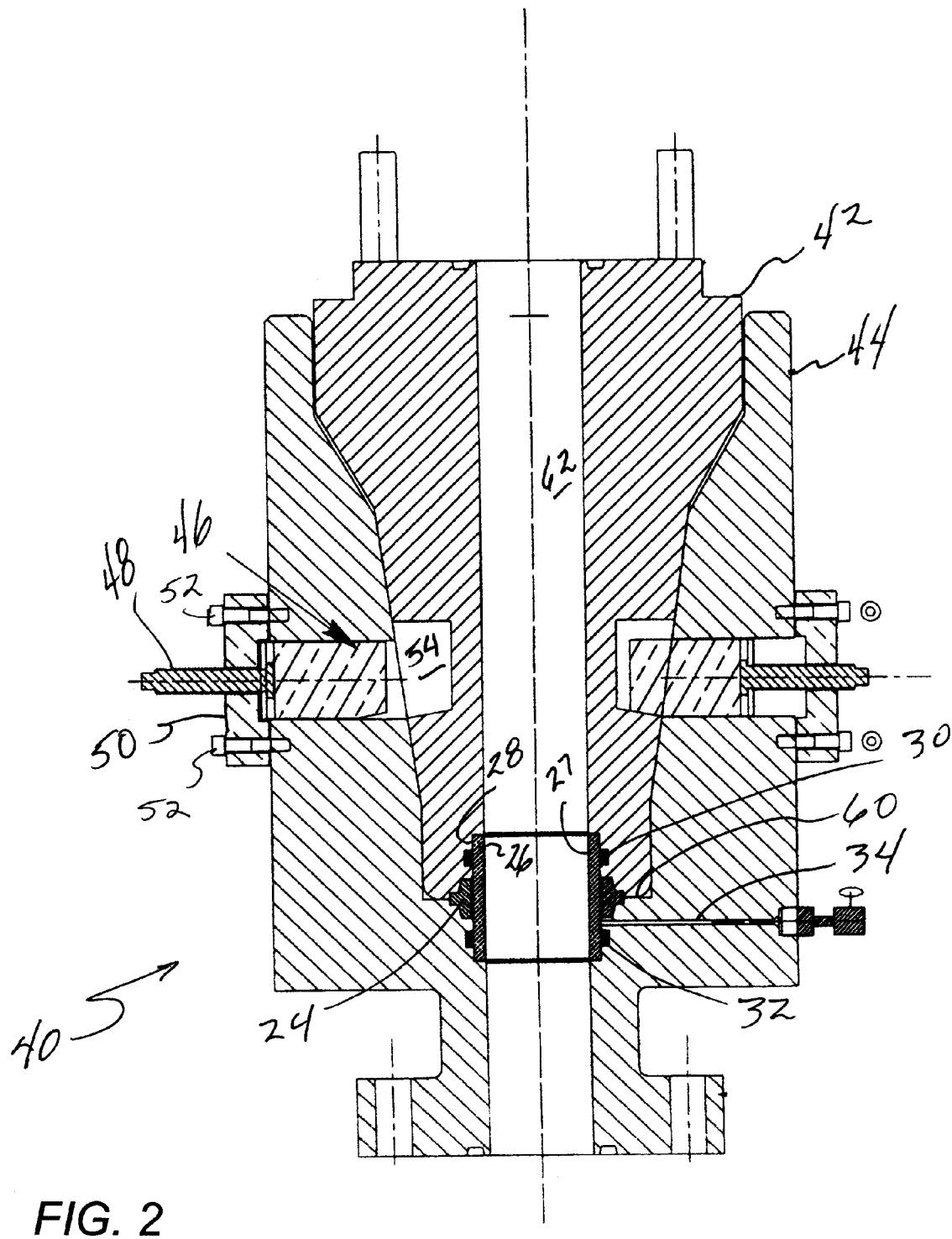
FIG. 2 is an elevation section view of a manually operated pipe connector with the self-testing metal primary seal of the present invention.

FIG. 2 illustrates the test apparatus of the present invention applied to a manually operated connector 40. The connector 40 comprises a male sealing sub 42 and a female sealing sub 44 held together with a locking wedge arrangement. The left side of FIG. 2 illustrates the connector in the released position, and the right side of the figure illustrates the connector in the locked position.

The locking wedge arrangement includes a locking wedge 46 which is run in and out with a hand wheel (not shown) similar actuation mechanism attached to a manual locking stem 48. The manual locking stem is threadedly engaged with a nut block 50 mounted to the side of the connector with a plurality of cap screws 52, for example. When the locking wedge 46 is run into the connector, as shown on the right of the figure, the wedge moves into a wedge-receiving chamber 54 with the resultant necessary force moving the male sealing sub 42 to compress the metal seal 24, as best seen on the left of the figure.

The connector 40 includes a seam 60 between the male sealing sub 42 and the female sealing sub 44, which provides a path for leakage of pressurized fluid with an axial chamber 62. As previously described, the testing device of the present invention includes the seal sleeve 26 having the inside surface 27 flush with the inside surface of the channel 62 and the outside surface 28 extending into the male and female sealing subs 42 and 44, respectively. The upper elastomeric seal 30 and the lower elastomeric seal 32 provide a seal between the upper and lower sealing subs, respectively, and the seal sleeve 26.

The test port 34 penetrates through the body of the female sealing sub 44 into the region of the seal sleeve 26. The test port penetrates into the female sealing sub at a point between the metal sealing gasket 24 and the lower elastomeric seal 32. In operation, the test port 34 is pressurized with a convenient fluid and held at pressure for a predetermined period. If the pressure in the test port is maintained for this predetermined period, the metal sealing gasket is intact and the joint does not leak. The joint is then ready for pressurization at operating pressure.

Figure 3:
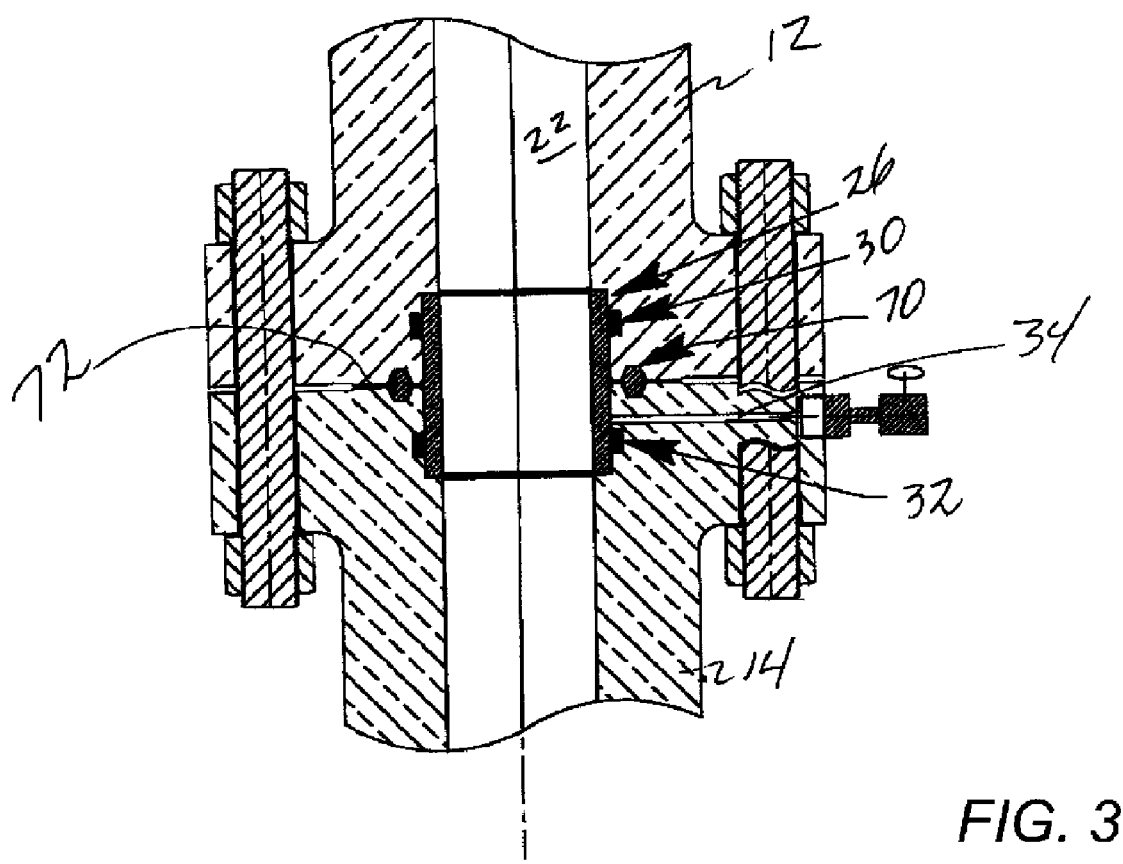
FIG. 3 is an elevation section view of a pipe joint with the test device of the present invention applied to a joint made up with a standard American Petroleum Institute seal ring.

Finally, FIG. 3 illustrates the present invention applied to a standard American Petroleum Institute (API) metal ring gasket 70. The gasket 70 is embedded between the upper flanged hub 12 and the lower flanged hub 14 at a spaced position away from the channel 22. The upper and lower elastomeric seals 30 and 32 are positioned in a manner like that of FIG. 1 between the seal sleeve 26 and the respective hub. The port 34 penetrates through the lower flanged sub to the vicinity of the seal sleeve, at a point between the lower elastomeric seal 32 and a seam 72 between the upper and lower flanged subs. As shown in FIG. 3, the metal seal ring 70 is positioned in the seam 72. Thus, pressurization of the port 34 tests the integrity of the metal seal ring 70 and, if it retains pressure for the predetermined period, the joint is intact and ready for pressure operations.

In the structure shown in the drawing figures and described above, a lip type seal was illustrated in order for the initial pressure test of a lubricator, for example, to by-pass the lip type seal and pressure test the metal seal. Those of skill in the art will recognize that an O-ring type seal or other seal may be used and in that event a separate by-pass port around the O-ring would be required. A valve would be used in that case to close that by-pass port when a subsequent test on the metal seal is to be performed, without the need to fill the lubricator.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

What is claimed is:

1. A seal test device for testing the integrity of a metal seal ring of a metal seal between an upper flanged hub and a lower flanged hub with the metal seal ring in a seam between the upper and lower flanged hubs, the upper and lower flanged hubs held together with a plurality of studs and the hubs defining a channel for the flow of a channeled fluid therethrough, the test device comprising:
   an elastomeric seal in the lower flanged hub;
   a pressurization port through the lower flanged hub between the seam and the elastomeric seal; and
   a source of pressurized fluid for introducing pressurized fluid into the pressurization port.

2. The device of claim 1, further comprising:
   an upper recess in the upper flanged hub;
   a lower recess in the lower flanged hub; and
   a seal sleeve in the upper and lower recesses.

3. The device of claim 2, wherein the pressurization port opens into the lower recess.

4. The device of claim 2, wherein the metal seal spans the upper and lower recesses.

5. The device of claim 2, wherein the metal seal is positioned at a spaced apart position from the sleeve.

* * * * *